(No Model.) 8 Sheets—Sheet 1.
E. K. HAYES.
COMBINED CHECK ROWER AND DRILL CORN PLANTER.
No. 533,952. Patented Feb. 12, 1895.

Fig. 1.

Witnesses:
Fred Gerlach
H. M. Richards.

Inventor:
E. K. Hayes
By W. B. Richards,
his atty.

(No Model.) 8 Sheets—Sheet 2.
E. K. HAYES.
COMBINED CHECK ROWER AND DRILL CORN PLANTER.

No. 533,952. Patented Feb. 12, 1895.

Witnesses:
Fred Gerlach
H. M. Richards.

Inventor:
E. K. Hayes
By W. B. Richards,
his Atty.

(No Model.) 8 Sheets—Sheet 3.
E. K. HAYES.
COMBINED CHECK ROWER AND DRILL CORN PLANTER.

No. 533,952. Patented Feb. 12, 1895.

Witnesses:
Fred Gerlach
H. M. Richards.

Inventor:
E. K. Hayes,
By W. B. Richards,
his Atty.

THE NORRIS PETERS CO., PHOTO-LITHO., WASHINGTON, D. C.

(No Model.) 8 Sheets—Sheet 4.

E. K. HAYES.
COMBINED CHECK ROWER AND DRILL CORN PLANTER.

No. 533,952. Patented Feb. 12, 1895.

(No Model.) 8 Sheets—Sheet 6.
E. K. HAYES.
COMBINED CHECK ROWER AND DRILL CORN PLANTER.

No. 533,952. Patented Feb. 12, 1895.

Witnesses:
Fred Gerlach
H. M. Richards.

Inventor:
E. K. Hayes,
By W. B. Richards
his Atty.

(No Model.) 8 Sheets—Sheet 7.

E. K. HAYES.
COMBINED CHECK ROWER AND DRILL CORN PLANTER.

No. 533,952. Patented Feb. 12, 1895.

Witnesses:
Fred Gerlach
H. M. Richards.

Inventor:
E. K. Hayes,
By W. B. Richards,
his Atty.

(No Model.) 8 Sheets—Sheet 8.

E. K. HAYES.
COMBINED CHECK ROWER AND DRILL CORN PLANTER.

No. 533,952. Patented Feb. 12, 1895.

Witnesses:
Fred Gerlach
H. M. Richards.

Inventor:
E. K. Hayes,
By W. B. Richards
his Atty.

UNITED STATES PATENT OFFICE.

EUGENIO K. HAYES, OF GALVA, ILLINOIS.

COMBINED CHECK-ROWER AND DRILL CORN-PLANTER.

SPECIFICATION forming part of Letters Patent No. 533,952, dated February 12, 1895.

Application filed February 10, 1894. Renewed December 22, 1894. Serial No. 532,723. (No model.)

*To all whom it may concern:*

Be it known that I, EUGENIO K. HAYES, a citizen of the United States, residing at Galva, in the county of Henry and State of Illinois, have invented certain new and useful Improvements in a Combined Check-Rower and Drill Corn-Planter, of which the following is a specification.

The combined check row and drill corn planter to which the invention that is herein described pertains, is of that general class or type of such planters, in which mechanism intergeared with one or more of the planter traction wheels is used for separating and elevating single grains of seed from the supply contained in the seed chamber, and delivering them singly and successionally to the seed tube, where they are detained by the check valve, until discharged by said check valve in quantities as desired for hills or deposits in the ground by a check rower line provided with tappets at such distances apart as desired between the hills or deposits of seed, and check rower mechanism intermediate the check rower line and the discharge check valve in the seed tube, and which check row planters are convertible into drill planters by simply dispensing with the check rower line and removing the discharge check valve, or locking the check valve in position such that it will not interfere with the passage of the single grains of seed for deposit singly in the ground for drill planting.

The efficiency and value of this type of combined check row and drill planters depends greatly on the certainty with which the mechanism which separates, receives and elevates the grains of seed from their fellows in the seed box, separates, receives, elevates and delivers a single grain and no more at each delivery, and the certainty with which such single grain separating, receiving and elevating mechanism acts, without missing, to separate, receive, elevate and deliver the seed at each of its operations, intended to accomplish that result; and further depends on the certainty with which the carrying wheels act on the separating, receiving, elevating and delivering mechanism; and a leading object of my invention is to furnish improved means for these purposes, in which a maximum of efficiency is obtained, not only in separating, receiving, elevating and delivering single grains, and no more, from the supply in the seed chamber, but in making such separations, elevations and deliveries, at each and every operation of the mechanism intended for that purpose, and in insuring uninterrupted action of the seed measuring and delivering mechanism when any of the driving wheels fail to rotate, from slipping or sliding on the ground.

Another leading object of my invention is to provide improved means whereby the seed separating, elevating and delivering mechanism is automatically thrown out of gear with the driving mechanism, when the forward frame is elevated to raise the furrow opening runners above the ground.

A further leading object of my invention is to provide a hand lever and a foot lever, both pivotally mounted on the rear frame of the planter, the foot lever hinged or pivoted at its forward end to the forward frame of the planter, and its other or rear end pivotally connected with the hand lever by a link or rod and a spring, forming an assemblage of parts so disposed and arranged as to produce a new combination, in which the parts are adapted separately and collectively to the office each has to perform, and which new combination produces a new mode of operation with new effects and results, as follows:—When the hand lever is adjusted and locked in position to hold the forward frame with its runners in the ground for planting, the forward frame and runners will thereby be held positively against upward movements thereof, while at the same time the driver or operator may with his feet force the forward end of the foot lever downwardly and thereby depress or lower the forward frame and runners, the spring now yielding to permit such depression of the forward frame and runners, and also yielding to permit of the forward frame and runners automatically lowering when the runners are in light, dry, easily cut soil where the seed should be planted deeper, and in passing over low places in the surface of the ground, and also yielding to permit of either or both supporting wheels rising and lowering without affecting the runners, in passing over obstructions or hard or uneven places in the soil, or from other causes.

Other objects of my invention are hereinafter described, and the constructions and combinations for carrying out the different objects thereof, and in which my improvements consist, are also hereinafter described and made the subject matter of claims hereto appended. A part of my improvements can be embodied in corn planters of different classes or kinds, without departure from the purview of my invention.

Mechanism embodying the preferred construction, arrangement and combination of the different parts, and the adjacent parts of an ordinary corn planter in which my improvements are incorporated, are illustrated in the accompanying drawings, in which—

The planter in which I have shown my improvements embodied, comprises a forward frame A, and rear frame A'. The forward frame is formed of bars $a$, fixed to transverse bars $a'$, $a^2$, and has the tongue $a^3$ adjustably mounted thereon between fixed bars $a^4$ by a transverse pivot bolt $a^5$ (Fig. 4) on which the tongue can be adjusted higher or lower at its forward end, and a bolt $a^6$ which passes through a slot $a^7$ in the tongue, (see dot lines at Fig. 2) and which is used to fix the tongue after adjustments thereof. The forward frame also supports the seed boxes $a^8$, chambers $a^9$, tubulated standard $a^{10}$ and runners $a^{11}$. The rear frame is formed of transverse frame bars $a^{12}$, $a^{13}$, and side frame bars $a^{14}$, which latter are hinged at their forward ends to the forward frame at $a^{15}$ to permit of flexure in a vertical plane between said frames. The rear frame has bearings for a rotatable axle B, on which the supporting wheels C are mounted, as hereinafter described, and carries the driver's seat D. The frame bars are preferably formed of hollow metal bars, square in their cross sections, and the frames described are ordinary frames, except as hereinafter specially described.

As a preferred way of mounting the hand lever E, (see Fig. 4) I have shown it pivotally connected by a pivot bolt $e$ with the lower part of a quadrant shaped rack bar $e'$, having teeth $e^2$ at its upper curved or arc-shaped part, and integrant at its lower part with a split collar or clip $e^3$ which embraces the forward frame bar $a^{12}$ and the forward part of the seat supporting bar, hereinafter described, and is clamped thereto and held by a bolt $e^4$. The hand lever E is also provided with ordinary locking mechanism, consisting of a spring actuated bolt or dog $e^5$, and a retracting rod $e^6$, thumb lever $e^7$ and a detaining link $e^8$. The foot lever or treadle G, formed of two bars $g$ astride of the lower ends of the hand lever E and the rack bar $e'$, is, at a point forward of its midlength, pivotally mounted on the bolt $e$, and its forward end is pivotally connected with the rearwardly extended end of the tongue $a^3$ by links $g'$. A foot plate $g^2$ is mounted on the forward end of the foot lever G, and a foot plate $g^3$ is mounted on a through bolt $g^4$ which connects the rear ends of the bars $g$. The rear end part of the foot lever is preferably curved or bent downwardly, as shown.

Figures 4, 5, 6:
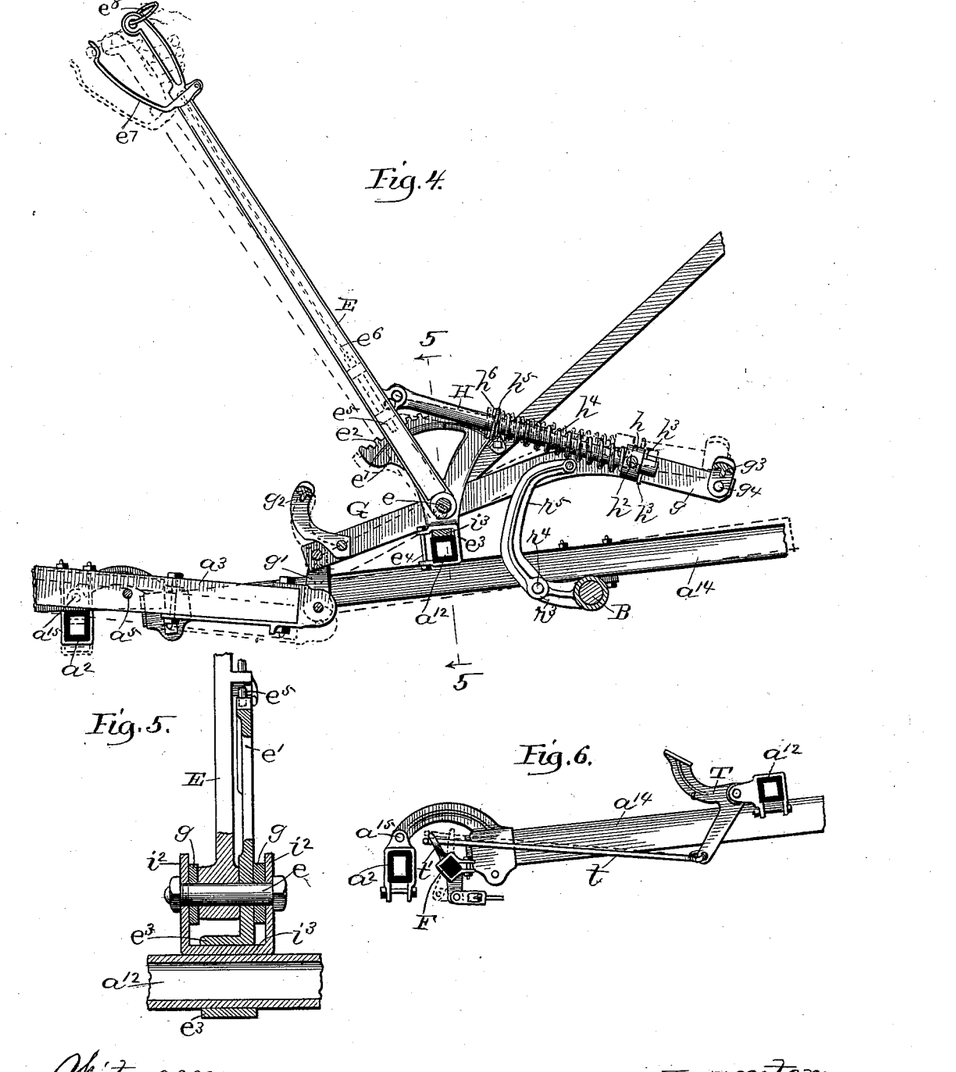
Fig. 4, a side elevation of the rear end of the tongue, and parts of the forward and rear frames, the hand lever, foot lever, spring, rack bar, part of each supporting bar, and other adjacent parts, the foot lever shown with its near side or bar removed, and other parts in section.
Fig. 5, a sectional elevation in line 5—5 in Fig. 4 of a transverse frame bar, the hand lever, rack bar, foot lever and adjacent parts.
Fig. 6, a side elevation, partly in section in the line 6—6 in Fig. 1, of one end of a rear frame bar, the coupling to forward frame, foot pedal for operating rock shaft, and adjacent parts.

Between the rear end parts of the bars $g$, and preferably in rear of the end therein, a bearing block $h$ with an aperture $h'$ is pivotally supported by trunnions $h^2$ which project therefrom, and are journaled, one in each bar $g$. A rod or link H, pivoted at its forward end to the hand lever E, extends rearwardly therefrom, and passes at its rear end loosely through the aperture $h'$ in the bearing block $h$, and fixed pins $h^3$ projecting radially therefrom contact with the block $h$ as hereinafter described. A spirally coiled spring $h^4$ encircles the rod H between the block $h$ and a disk $h^5$, which disk is held after adjustment on the rod H by a split key or pin $h^6$ which can be inserted in either of the holes $h^7$ in the rod H, as may be required for adjusting the tension of the spring $h^4$, between the pin $h^6$ and bearing block $h$.

The driver's seat D is adjustably supported by bracing bars $i$ which are fixed to the rear transverse frame bar $a^{13}$ at their lower ends, and are at their upper ends bolted to the rear end parts of a bar $i'$ which is formed of two end parts $i^2$ and the part $i^3$ which unites them. The part $i^3$ is located between the clip $e^3$ and the forward frame bar $a^{12}$, and held by said clip.

Ordinary scrapers J, which swing by their gravity away from the wheels, and which are adapted to split wheels, are fixed to a scraper shaft $j$ which is mounted in bearings pendent from the rear bar $a^{13}$, and a rod or link connects a radial bar $j'$ on said shaft with one end of a foot treadle $j^2$ by which the scrapers can be applied to the wheels in the usual way.

When the hand lever is swung forwardly, the rod H, acting through the pins $h^3$ on the block $h$ will force the rear end of the foot lever upwardly and its forward end downwardly, and thus force the forward end of the rear frame, and the entire forward frame downwardly, and in this manner the forward frame can be adjusted to adjust the depth of penetration of the soil by the runners, and when the hand lever is locked after such adjustments it will hold the runners in the soil, at whatever depth adjusted, with a positive or unyielding force in so far as upward or rising flexure between the forward and rear frames is concerned, and thus with great reliability and certainty secure uniformity of depth at which the seed is deposited in the different hills.

While the forward frame and runners are held or locked, as described, against upward movements thereof, they are permitted downward movements to a limited extent, by the action of any force which will lower the front end of the foot lever G, and raise its rear end, the block $h$ sliding on the rod H and compressing the spring $h^4$ to permit of such movement of the foot lever as shown by dot lines at Fig. 4. Thus means are provided by which the driver can, by pressing with his feet on the foot plate $g^2$, force the forward frame downwardly to cause the runners to penetrate the soil properly as the forward frame and runners pass over low places, and to penetrate it at a greater depth, as may be desirable in places in the field where the soil is very dry or loose; and with the tension on the spring $h^4$ properly adjusted, in passing over low places or loose dry soil, the resistance to the runners being considerably reduced, the weight of the forward frame and runners will compress the spring and thus allow the runners to operate lower. When the supporting wheels C pass over ridges, or slight elevations of any kind, their elevation will not affect the uniform depth of penetration of the runners, as the rear end of the rear frame will be raised thereby, thus raising the frame bar $a^{12}$ and rear end of the foot lever G, and compressing the spring $h^4$ as hereinbefore described, to permit of such movements.

Figure 2:
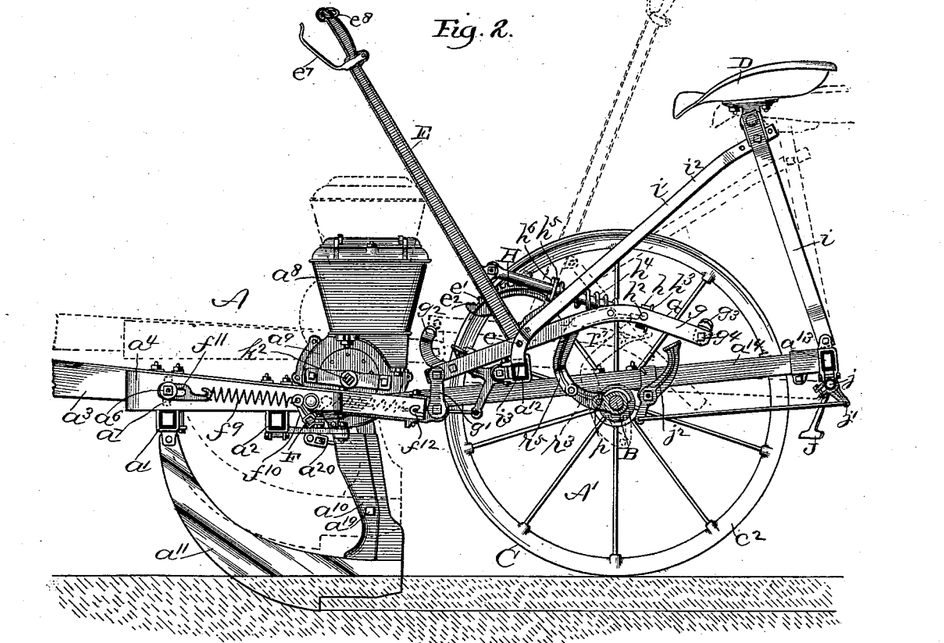
Fig. 2, a sectional elevation in the line 2—2, in Fig. 1.

In swinging the hand lever rearwardly to raise the runners entirely above the ground surface, the rod H will be forced backwardly to a limited extent through the block $h$, and the spring $h^4$ be thereby compressed so as to relieve all shock of the parts while so raising the forward frame and its runners; and when the forward frame is raised to the height desired, and as shown by dotted lines at Fig. 2, it will be positively locked and held in such position for local transportation on the planter wheels by means hereinafter described.

In all adjustments of the hand lever, the driver may assist with his feet on whichever end of the foot lever may be necessary.

I have shown and described the hand lever and foot lever as having their centers of motion on the same axial line. It will be evident, however that, without departure from the purview of my invention, their centers of motion may be varied from such requirement to any extent that does not affect their mode of operation, in combination with the spring and the rod H.

Figure 1:
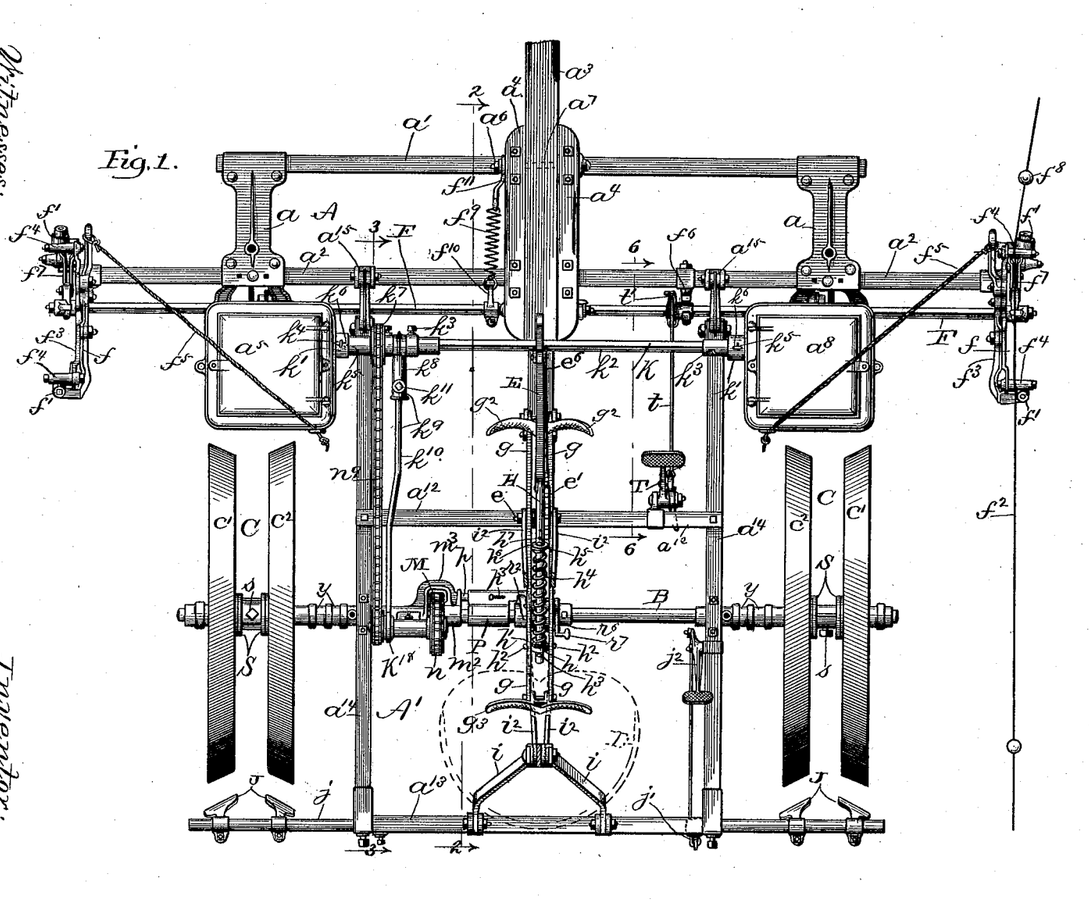
Figure 1 is a top plan of a planter embodying my improvements—the seat shown in dot lines, and its supporting bars and the tongue partly broken away.

The ends of the bar $a^2$ are extended in an ordinary way, and each extended end thereof carries a check row head $f$ with guard pulleys $f'$ for the check rower line $f^2$, and a swinging check rower line doffer frame $f^3$, carrying check rower line supporting pulleys $f^4$, and a cord $f^5$ for operating the doffer. The check rower rock shaft F is journaled in the heads $f$ and in brackets $f^6$ which are fixed to the bar $a^2$, and has mounted on each of its ends a forked lever $f^7$. As the planter advances, one of the forked levers comes into contact successionally with the tappets $f^8$ on the check rower line, and as it (the forked lever) contacts with a tappet, it is swung rearwardly thereby, and thus rocks or swings the rock shaft F rearwardly. The forked lever then by its inclined position escaping from the tappet frees both it and the rock shaft, and a retractile spring $f^9$ (Fig. 1), connecting a radial arm $f^{10}$ on the rock shaft with the bolt $a^6$ gives the rock shaft and forked lever a reverse or return movement, and thereby restores them to their normal positions and ready for another movement by contact with the next succeeding tappet. The spring $f^9$ is connected with the bolt $a^6$ by a slotted rod $f^{11}$, whereby the tension of the spring may be adjusted.

The check rower mechanism described, that is, the rock shaft, forked levers, tappet wire, check rower heads, guard pulleys, and check rower line and doffing mechanism with line supporting pulleys, are the same, and operate separately and collectively as do the same parts of the check row mechanism shown in my patent for corn planters, No. 384,363, issued to me June 12, 1888.

The chamber $a^9$ is located beneath the seed-box or hopper $a^8$, and the seed-box bottom has an opening at one side (see Fig. 8), through which the seed feeds to the chamber at such rate that a quantity is kept at all times in the lower part of the chamber, as shown at said figure. The confronting sides of the two chambers $a^9$, one below each seed box, have each a section of seed tube $a^{16}$ which fits into the seed tube $a^{17}$ in the adjacent standard $a^{10}$. The section $a^{16}$ has a peep hole $a^{18}$ in its outer wall (see Fig. 7), and an aperture $a^{19}$ in the wall of the chamber $a^9$ forms a communicating passage between the interior of each chamber and its section of tube $a^{16}$. Beneath each seed tube $a^{17}$ (see Fig. 7) is located a hollow valve $a^{23}$, square in its cross section, extended upwardly at one side, and pivoted at $a^{29}$ in the hollow front part of the standard $a^{10}$, and thence extends upwardly and is pivotally connected at its upper end by links $a^{20}$ with a radial arm $a^{21}$ on the rock shaft F.

Figure 7:
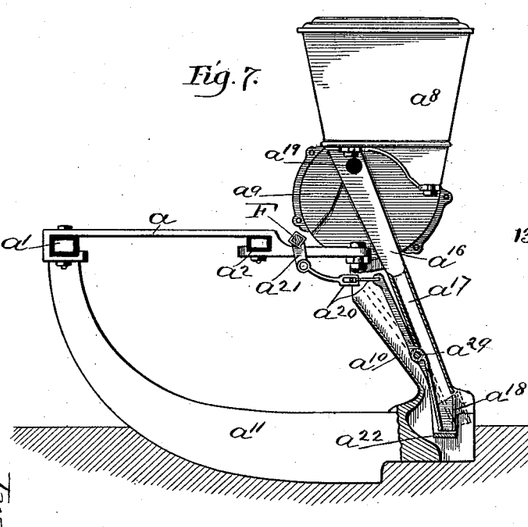
Fig. 7, a side elevation of parts of the forward frame, seen from its side toward the center of the planter; the lower part of the seed tube and standard, rear end of runner, seed detaining valve, and transverse frame bars in section.

When the valve $a^{18}$ is in the position shown by full lines at Fig. 7, at rest with its lower end above the shelf $a^{22}$, it will receive and detain seed until the rock shaft F is swung rearwardly, when it (the valve) will be swung into the position shown by dot lines at same figure, and thereby not only discharge its contained seed, but will also throw them rearwardly with a varied velocity between its different throws, corresponding and timing with the varied velocity in the travel of the planter in operation, and thus secure uniformity of distance between the deposits or hills of seed. The valve $a^{18}$ is returned to its position of rest over the shelf $a^{22}$ by the reverse turn or swing of the rock shaft.

Figure 13:
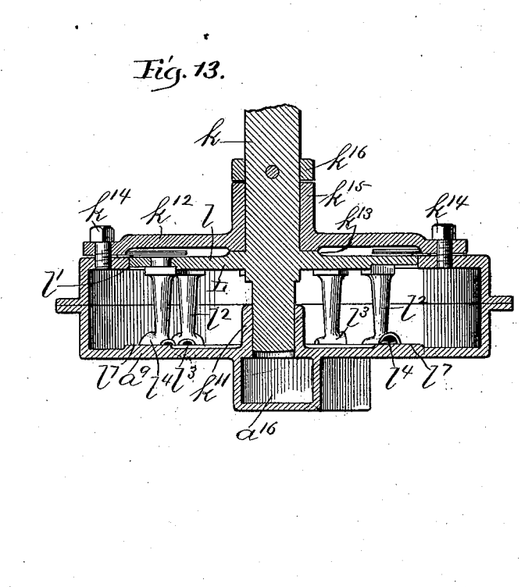
Fig. 13, a sectional plan, in the line 13—13, in Fig. 8.
Figure 16:
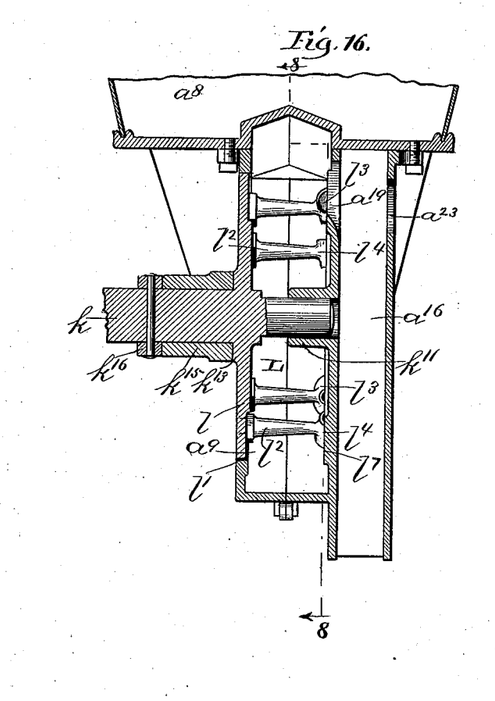
Fig. 16, an oblique sectional elevation, in the line 16—16, in Fig. 8.

The seed cup wheels L are fixed, one on and near to each end of a shaft K which extends across the planter. The shaft K is in sections,—a short section $k$ at each end thereof (see Figs. 13 and 16), a tubular section $k'$ near each end thereof (see Fig. 1), and an intermediate section $k^2$, connecting the tubular sections $k'$ and fixed thereto by set screws $k^3$. One end of each section $k$ is seated in the adjacent end of its respective tubular section $k'$ and held therein by a pin $k^4$ which passes through holes $k^5$ in the section $k'$ and through a slot $k^6$ in the section $k$, so that the section $k$ is held to rotate with the section $k'$, while free to slide endlong of itself to a limited extent. One of the sections $k'$ is lengthened, and has a sprocket wheel $k^7$ fixed thereon, and a tubular part $k^8$ of a rod $k^9$ journaled thereon—the other part $k^{10}$ of which rod is adjustably fixed at one end to said tubular part by a set screw $k^{11}$, and its other end is secured as hereinafter described.

Figure 14:
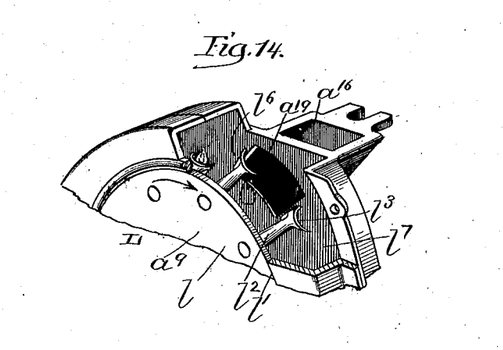
Fig. 14, a perspective of part of the seed cup wheel, its chamber and the tubulated standard.

Each seed-cup wheel comprises a disk $l$ which fits loosely so as to revolve in an opening $l'$ in the side wall of a chamber $a^9$, and is fixed to or integrant with one of the sections $k$ of the shaft K, and further comprises a circular series of arms $l^2$ which project from one side of the disk $l$ substantially parallel with the axis of rotation of the disk, and which arms each carry a seed cup $l^3$ at its outer end, formed by a tapering groove $l^3$ in a plate $l^4$. The bottoms of the grooves or seed cups $l^3$ are preferably involute curves in their cross sections, or of such form that the discharging side $l^5$ of the seed cup is of a less degree or amount of curvature than its other side, $l^6$, as shown best at Figs. 8 and 14. The arms $l^2$ are of such lengths that the edges of the seed cups, as shown best at Figs. 13 and 16, revolve in contact or nearly in contact with a circular track $l^7$, the side of which adjacent to the seed-cups is turned or planed with a smooth flat surface.

Figure 8:
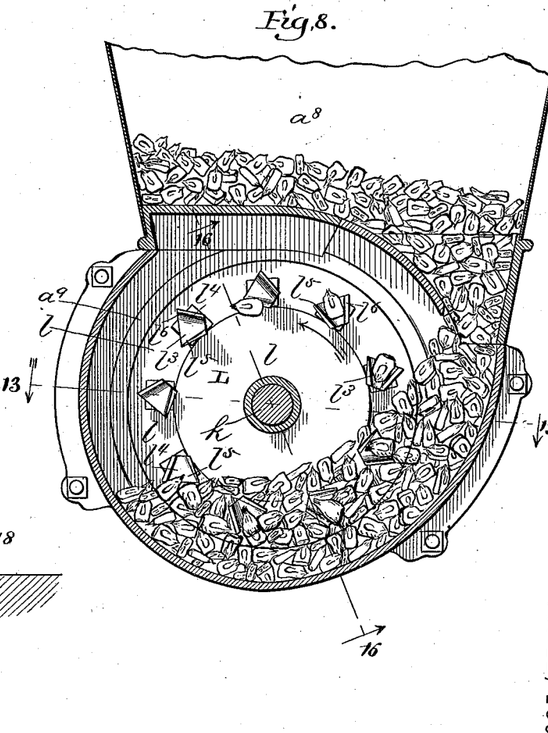
Fig. 8, a sectional elevation of the chamber for the seed cup wheel and part of the seed box, and side elevation of the seed cup wheel, in the line 8—8 in Fig. 16.
Figure 9:
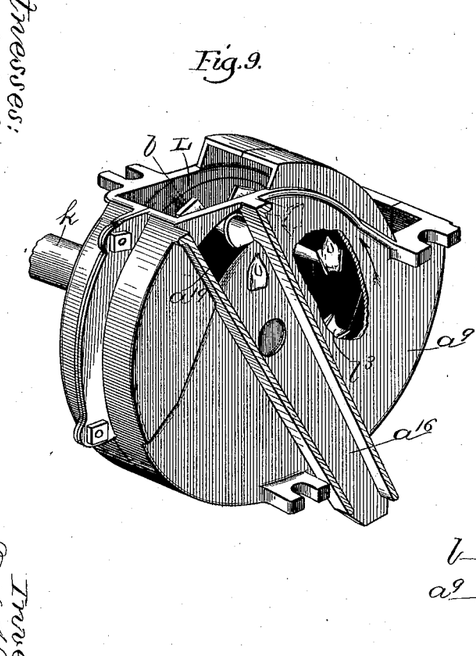
Fig. 9, a perspective of the chamber for the seed cup wheel, partly broken away, seen from its side toward the center of the planter, and showing the seed discharge aperture, and the upper part of the seed tube with its near side removed, and part of the seed cup wheel.

The seed cups are shown with their smaller ends open, but they may be closed if preferred. An essential feature of the seed-cups is that a line lengthwise of the groove which forms each seed-cup, is of such obliquity to a radial line from the center of motion of the disk $l$, or in other words, that each seed cup is so fixed with reference to the disk $l$ or the seed-cup wheel, that it will be in position as it passes through the lower part of its orbit and through the seed, as shown at Fig. 8, to receive a grain, and sometimes two grains of seed, and further that its position will be such as to retain a single grain of seed until it reaches a position vertically above the axis of the seed-cup wheel, when it will still be in such position as to retain the grain of seed from escape at its larger end, but will permit it to escape from its side $l^5$, laterally through the aperture in the side wall of the chamber $a^9$ as hereinafter described. This function of detaining a single grain of seed from escape at the larger end of the seed-cups as they successionally reach their highest positions, where they will permit it to escape from the side of the seed-cup, is a very important function, as it not only insures the retention of the single grain of seed until the discharging place is reached, but it causes such single grain to be retained while all others escape, as hereinafter described.

Figures 10, 11:
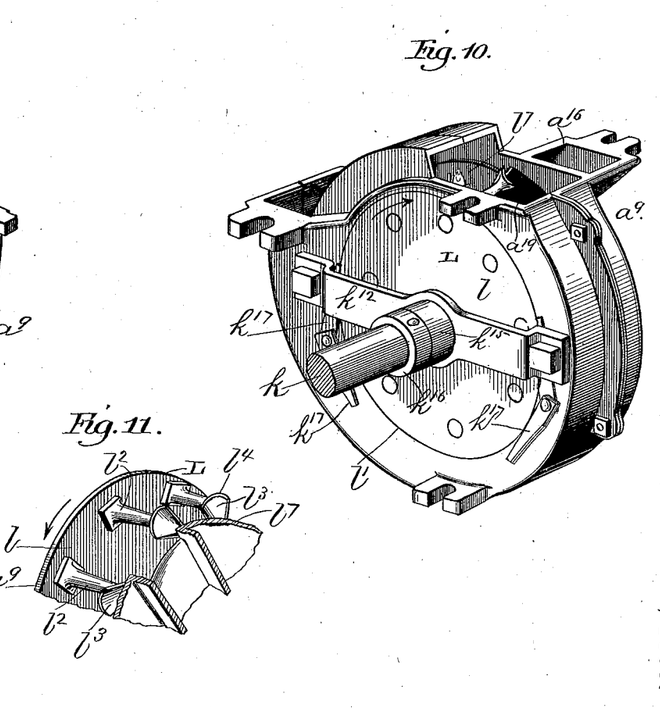
Fig. 10, a perspective of the parts shown at Fig. 9, but seen from the opposite side, and showing the rotatable shaft, and means for adjusting the seed cup wheel.
Fig. 11, a perspective of part of the seed cup wheel, and a part of one side of its containing chamber broken away at its upper side to better show the relation of the seed cups to the delivery aperture, and to the seed tube, partly shown.
Figure 12:
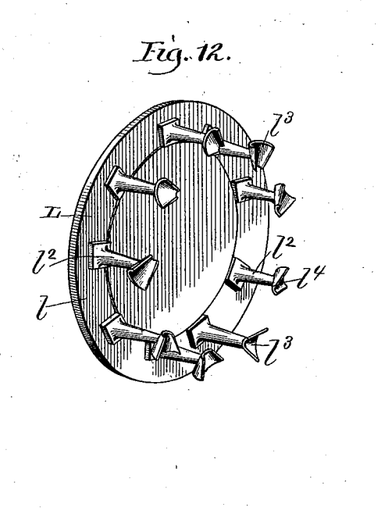
Fig. 12, a perspective of the seed cup wheel.

The end of each section $k$ within its respective chamber $a^9$ has a bearing in a boss $k^{11}$ in the chamber wall, and its outer end has a bearing in a bent bar $k^{12}$, (see Fig. 13,) the ends of which rest against the walls of the chamber $a^9$, and the central part of which has a boss $k^{13}$ that rests against a similar boss on the disk $l$. A set screw $k^{14}$ passes loosely through each end of the bar $k^{12}$, and screws into the wall of the chamber $a^9$. By loosening these set screws the outer boss $k^{15}$ on the bar $k^{12}$ contacts with the fixed collar $k^{16}$, and the section $k$ can thus yield backwardly to permit of the seed-cup wheel so yielding to a very slight extent, and thus prevent interference with its free revolution when the seed-cups are charged with seed that may sometimes tend to interfere therewith. The extent of such yielding of the seed-cup wheel is governed by turning such number of the spacing strips $k^{17}$ as required into position between the ends of the bars $k^{12}$ and the chamber wall. See Fig. 10.

Figure 3:
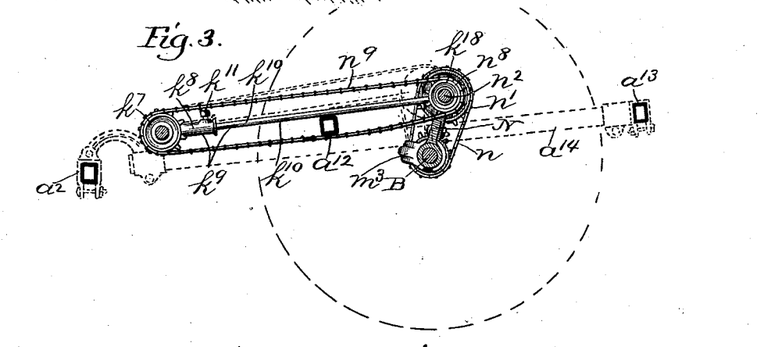
Fig. 3, an elevation, partly in section, in the line 3—3 in Fig. 1, of the mechanism for transmitting motion from the planter axle or wheels to the seed cup wheel.
Figure 17:
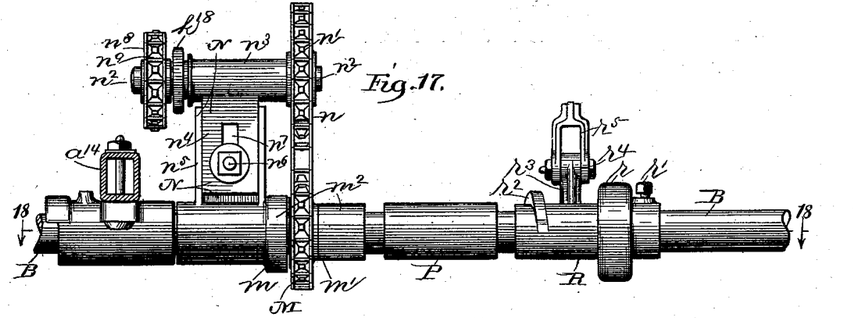
Fig. 17, a rear side elevation of the axle for the supporting wheels, of the driving gear for transmitting motion to the seed cup wheels, and of other adjacent parts.

The sprocket wheel M is loosely mounted on the axle B between the parts $m$, $m'$, of a sleeve $m^2$ which is also loosely mounted on the axle. The sprocket wheel M is geared by a sprocket chain $n$ with a sprocket wheel $n'$ which is fixed on a shaft $n^2$ that is supported in a bearing $n^3$ at the upper end of an adjustable swinging standard N, the lower end of which is fixed to the part $m$ of the sleeve $m^2$. The standard N is in two parts, $n^4$, $n^5$, (see Fig. 17,) which are adjustable to lengthen or shorten said standard to tighten or slacken the chain $n$, and are held in position after such adjustments by a bolt $n^6$ which is seated in the part $n^5$ and passes through a slot $n^7$ in the part $n^4$. The shaft $n^2$ also carries another sprocket wheel $n^8$ on its other end, and a sprocket chain $n^9$ gears the wheel $n^8$ with the sprocket wheel $k^7$, so that rotations of the sprocket wheel $n^8$ will rotate the sprocket wheel $k^7$, the shaft K and the seed-cup wheels. The rear end of the part $k^{10}$ of the rod $k^9$ is formed into an eye $k^{18}$ (see Figs. 3 and 17) which loosely encircles a projecting end of the bearing $n^3$. By adjustments of the part $k^{10}$ of the rod $k^9$ in the part $k^8$, the rod $k^9$ can be lengthened or shortened, and is fixed after such adjustments by the set screw $k^{11}$. By such adjustments of the rod $k^9$ the swinging standard N can be adjusted in different radial positions on the axle B, to tighten or slacken the sprocket chain $n^9$. The rod $k^9$ will also hold the swinging standard N at such radial positions on the axle B as to keep the sprocket chain $n^9$ taut during all adjustments of the forward frame of the planter in higher and lower positions. By interchanging the sprocket wheels, in an evident manner, they can be made to rotate the seed-cup wheels with increased or with diminished velocity, and thus be made to drop a greater or lesser number of charges of single grains of seed in the same distance of travel of the planter.

Figures 18, 19, 20, 21:
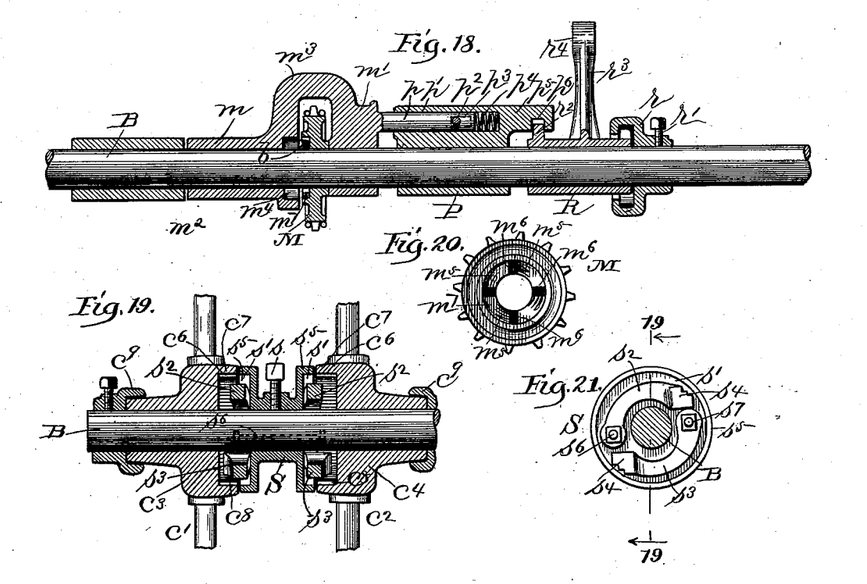
Fig. 18, a plan, in the line 18—18 in Fig. 17.
Fig. 19, an axial section, in one of the two part wheels, in line 19—19, in Fig. 21.
Fig. 20, a side elevation of the sprocket wheel, shown in section at Fig. 18.
Fig. 21, an end elevation of one member of the clutch shown at Fig. 19.

The parts $m$, $m'$, of the sprocket wheel M are connected by a yoke $m^3$. See Figs. 1, 3, 17, and 18. The end of the part $m$ confronting the sprocket wheel M has a recess $m^4$, and the confronting side of said sprocket wheel, as shown at Fig. 20, has recesses $m^5$ with inclined bottoms, each of which terminates against a shoulder $m^6$, and together form one member of a clutch $m^7$. A radial pin $b$ fixed to the axle B forms the other member of said clutch, and is adapted to engage with either of the recesses $m^5$ in the sprocket wheel, as shown at Fig. 18, and cause it to rotate with the axle B when said sprocket wheel is moved toward the left hand side of the planter, and is disengaged therefrom when the sprocket wheel is moved in an opposite direction to bring the recess $m^4$ over the pin $b$, in which recess the pin revolves without affecting the sprocket wheel M. These movements of the sprocket wheel M endlong of, and to throw it into and out of gear with the axle, as described, are given to it respectively by lowering the forward frame for planting, and raising it above the ground for local transportation, as follows: A short bolt $p$ projects from one end of the sleeve $m^2$ into a hole $p'$ in a sleeve P, which sleeve is loosely mounted on the axle B, and a through pin $p^2$ projects radially from the upper and lower sides of the bolt $p$ through slots $p^3$ in the upper and lower sides of the walls of the sleeve P. One of these slots, (the lower one) is shown by dot lines at Fig. 18. A spring $p^4$ is located between the outer end of the bolt $p$ and the closed end of the hole $p'$. An arm $p^5$ projects from one end of the sleeve P, and has a transverse groove $p^6$ in its side facing the axle. The sleeve R is mounted loosely on the axle to oscillate circumferentially thereof, while held against movement endlong of the axle by a clamp $r$ of ordinary construction and locked to the axle by a set screw $r'$. A shipper cam $r^2$ spirally or obliquely arranged on the sleeve R, as shown best at Figs. 1 and 17, projects into the groove $p^6$ in the sleeve P, as shown best at Fig. 18. An arm $r^3$ projects radially from the sleeve R, and is hinged at $r^4$ to a curved arm or link $r^5$ which is bent laterally at its upper end where hinged to the rear end of the foot lever G, and has a crank arm $r^6$ on its upper end, with a foot plate $r^7$.

When the foot lever G is lowered at its rear end, in raising the forward frame with its runners above the ground, as shown by dot lines at Fig. 2, the arm or link $r^5$ forces the arm $r^3$ downwardly into the position shown by dot lines at Fig 2, and turns or swings the sleeve R and the shipper cam $r^2$, and the shipper cam acting on the side wall of the groove $p^6$ shifts or forces the sleeves P and $m^2$ endlong of the axle B, and the sleeve $m^2$ carries the sprocket wheel M along with it and out of gear with the pin $b$ on the axle, and into the recess $m^4$, so that the rotations of the axle will not transmit motion to the seed cup wheels while the forward frame is so elevated. Lowering the forward frame into position for planting gives a reverse movement to the parts and forces the sprocket wheel into clutch gear with the pin $b$ and the axle, as shown at Fig. 18, so that the axle will, as hereinbefore described, revolve the seed cup wheels by its intergear therewith. While the sprocket wheel is in the position shown at Fig. 18, in gear with the pin $b$, and while passing into gear therewith, the sping $p^4$ acts as a cushion to prevent shock, and when the sleeve P is drawn backwardly to draw the sprocket wheel out of gear with the pin $b$, the end of the slots $p^3$ engage with the ends of the pins $p^2$ and move the sprocket wheel with a positive motion.

When the hand lever is swung rearwardly at its upper end, and the foot lever simultaneously lowered at its rear end, to elevate the forward frame with its runners at such height above the ground as is desirable in turning at the ends of rows and for local transportation of the planter, the arm $r^3$ and link $r^5$ will be moved thereby into the relative positions shown by dot lines at Fig. 2, with the link $r^5$ in contact with the sleeve R. While in said dot line position the parts are all locked and held against either upward or downward movement, by the arm $r^3$ and link $r^5$, and the forward frame thereby positively locked and held in its elevated position.

The driver by pressure with his foot on the foot plate $r^7$ can tilt or turn the arm $r^6$ and the link $r^5$ which is rigidly connected therewith, so as to bring the lower end of the arm $r^3$ forward and thereby release the lock, and permit of lowering the forward frame, and of all other movements thereof, by means of the hand and foot levers, until again locked as described.

As means for covering the deposits of seed and compressing the soil at each side of the rows thereof, the two wheels $c'$, $c^2$, at each side of the rear frame is a wheel C, but in so far as their function of rotating the axle B is concerned, they are separate and independent wheels. The wheels $c'$, $c^2$, of each pair thereof are journaled independently of each other on the axle B, with their rims a short distance apart and preferably inclined or tapered inwardly toward each other as shown, and in a usual manner. Interposed, as shown at Fig. 19, between the hubs $c^3$, $c^4$, of the wheels $c'$, $c^2$, respectively, and fixed upon the axle B by a set screw $s$, is one member, S, of a dual clutch, which member S has annular shaped recesses $s'$ in each of its ends, in each of which recesses a pair of swinging pawls $s^2$, $s^3$, are pivoted at one of their ends, their other or free ends being formed into serrated or toothed heads $s^4$, as shown at Fig. 21. The free ends of the pawls $s^2$, $s^3$, are of such thickness that they project beyond the rim $s^5$ which surrounds each recess $s'$ as shown at same figure. The pawls $s^2$, one at each end of a clutch S, are pivoted on the same plane of centers, and preferably one on each end of the same bolt $s^6$, (see dot lines at Fig. 19,) and extend from such pivotal points or centers of movement in the same direction circumferentially of the axle. The pawls $s^3$, one at each end of a clutch S, are also pivoted on the same plane of centers, and preferably, one on each end of the same bolt $s^7$, and extend from such pivotal points or centers of movement in the same direction circumferentially of the axle. The ends of the hubs $c^3$, $c^4$ which confront the ends of the clutch S respectively, have each a recess $c^6$ of substantially the same diameter as the recess $s'$, each of which recesses has a surrounding rim $c^7$, with serrations or teeth $c^8$ on its inner surface, and extends over the projecting sides of its adjacent pair of pawls $s^2$, $s^3$, (see Fig. 19,) where they are held against movement endlong of the axle by collars $c^9$ at the ends of the hubs and fixed to the axle. Whichever pawl $s^2$, $s^3$, is lowermost during the rotations of the axle B, or when it is at rest, as shown at Fig. 19, will by gravity swing outwardly and be engaged by the serrated or toothed inner side of the adjacent rim $c^7$ when the adjacent wheel is rotated by the forward movement of the planter. When the planter is backed, or the wheels turned in an opposite direction, they will not act on said pawls. In this assemblage of the dual clutch and two independently rotating wheels, $c'$, $c^2$, at each side of the planter, the disposition and arrangement of the parts is such, that the rotation of either one of the four wheels in the direction in which it is rotated by the forward movement of the planter, will rotate the axle without rotating either of the other three wheels, and is such, that when either wheel, or two wheels, or three wheels slip without rotating for shorter or longer distances, the wheel or wheels not slipping will rotate the axle B, and when all of the wheels but one are slipping the slipping wheels will not prevent that one uniformly rotating the axle, and thereby, by the means described, revolving the seed-cup wheels while the planter is in operation, whereby the seed-cup wheels will be constantly revolved or approximately so, and thereby uniform numbers of grains of seed be delivered to the lower or discharge valve, between each of the discharging movements given it by the tappets on the check rower line, and thus uniformity be assured in the number of grains in the different charges of seed for hill or check row planting; and also uniformity in the delivery of single grains of seed for drill planting.

In planting short rows that often occur in finishing fields in check row planting, it is desirable to have means by which the driver may actuate the lower valve, and dispense with the check rower line. For this purpose I have pivotally mounted a foot pedal T on the frame bar $a^{12}$, and connected it by means of a link $t$ with the outer end of a radial arm $t'$ on the rock shaft. The driver can operate the lower valve by means of the foot pedal T in the usual manner. By adjustments of the tongue, as hereinbefore described, in higher positions at its forward end, the forward frame will be held to incline the seed-tube with its lower end advanced, and by adjustments of the forward end of the tongue in lower positions the seed-tube will be inclined so as to carry its lower end rearward; and by means of these adjustments the planter may be made to check-row properly, after starting a row and discovering that the check-rower line is fixed to actuate the lower valve $a^{18}$ a little too late or a little too soon.

For selecting a grain of seed with the greatest certainty by each seed cup as it sweeps in its orbit through the mass in the lower part of the chamber $a^9$, the mouths of the seed-cups are preferably inclined substantially at an angle of about forty degrees from a radial line extending from the axis of rotation of the seed-cup wheel past and touching the outer end of the discharge side of the seed cup. This angle may however vary several degrees without affecting said operation, and to insure the retention of a single grain until the aperture $a^{19}$ is reached by the seed-cup, and also insure discharge of surplus grains, the discharge side $l^5$ of the seed-cup should be substantially at an angle of about one hundred and twenty degrees from the same radial line. It may however vary a few degrees from such obtuse angle.

The main advantages or new functions of the described arrangement and disposition of the seed-cups are briefly as follows: By reference especially to Figs. 8, 9, 10, 14 and 15, it will be seen that each seed-cup is in such position as to retain a single grain of seed until it reaches the discharge aperture, when as shown especially by Figs. 8, 9, 10, and 14, the grain of seed will drop by its gravity from the side $l^5$ of the seed-cup, and fall laterally of the seed-cup-wheel, and pass through the aperture $a^{19}$ out of the chamber $a^9$ and into the seed-tube $a^{16}$. The lower wall of the aperture $a^{19}$ is preferably beveled inwardly toward the seed-cup wheel, as shown best at Fig. 16, to facilitate the passage of the seed therethrough.

Figure 15:
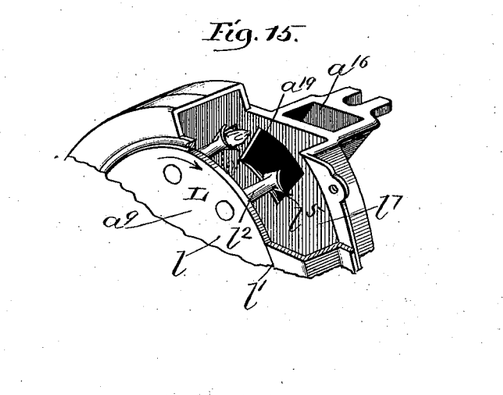
Fig. 15, the same perspective as Fig. 14, but showing the seed cups in different relative positions to the delivery aperture, from that shown at Fig. 14.

Sometimes two grains of seed will be carried upwardly by a seed-cup, one of which grains in nearly every such case, will be well seated in the seed-cup and the other of which mainly by reason of the tapering form of the seed cup will necessarily project over the large end of the seed-cup, as shown at Fig. 15, to such an extent that it will, before said cup reaches the aperture $a^{19}$ fall from the larger open end of the seed-cup and down into the chamber $a^9$, as shown by dot lines at same figure, and thus leave but one grain of seed in the seed-cup, for delivery to the seed-tube.

The seed-cup wheels, continuously actuated by intergear with the planter wheels, deliver the single grain charges of seed to their respective seed-tubes, in each of which they are detained by the valve $a^{18}$ until it is operated by intergear with the check rower line to swing rearwardly and discharge its contained charges of seed into the ground for check row planting, in hills, the number of grains in such charges being regulated or controlled, by the number of seed-cups on the seed-cup wheels, or by changing the intergear sprocket wheels, as hereinbefore described.

For drill planting, the spring $f^9$ is disengaged from the hook rod $f^{11}$ (see Fig. 2), swung over rearwardly and engaged with a hook $f^{12}$ on the rear end of the tongue in such manner as to swing the radial arm $f^{10}$ rearwardly and hold it in such position, and thereby hold the valve $a^{18}$ in the position shown by dot lines at Fig. 7, to permit the grains of seed to drop singly to their positions in the soil, as delivered from the seed-cup wheels.

For adjusting the distance between the wheels C, to conform to other adjustments, in an ordinary manner, of the width of the planter, such number of spacing sleeves $y$ (see Fig. 1) may be used as is necessary for such adjustments.

What I claim as new is—

1. In a corn planter, and in combination substantially as hereinbefore described, with the forward and rear frames thereof pivoted or hinged to each other, a foot treadle or lever and a hand lever, both pivotally mounted on the rear frame—the extended forward end of the foot lever hinged to the forward frame, a rod pivotally connected with the hand lever at its forward end, and slidably connected at its rear end with the rear end of the foot lever, a spring interposed between a stop fixed to said rod at the forward end of the spring and a bearing block carried by the foot lever, and adapted to yield to permit of limited upward movement of the rear end of the foot lever, and thereby permit of limited downward movement of the forward frame while the hand lever is locked in position in planting.

2. In a corn-planter, and in combination substantially as hereinbefore described and for the purposes specified, with the forward and rear frames thereof pivoted or hinged to each other, a foot treadle or lever and a hand lever both pivotally mounted on the rear frame—the extended forward end of the foot lever hinged to the forward frame, a rod pivotally connected with the hand lever at its forward end and slidably connected at its rear end with a bearing block mounted on the rear end part of the foot lever, a spring interposed between a stop fixed to said rod at the forward end of the spring and said bearing block, and a stop or pin at the rear end of said rod, which stop, when the hand lever is locked, limits the movement or slide of the rod forwardly through said bearing block, but permits of its free movement therethrough rearwardly while resisted by the force action of the spring.

3. In a corn planter, and in combination substantially as hereinbefore described, and for the purposes set forth, with the forward and rear frames thereof pivoted or hinged to each other, a foot treadle or lever and a hand lever, both pivotally mounted on the rear frame—the extended forward end of the foot lever hinged to the forward frame, a rod pivotally connected with the hand lever at its forward end and slidably connected at its rear end with a bearing block $h$ pivotally mounted on the rear end part of the foot lever, a spring, $h^4$, spirally coiled on said rod and interposed between a stop $h^6$ fixed to said rod at the forward end of the spring and said bearing block, and a stop or pin $h^3$.

4. In a corn planter, and in combination substantially as described, and for the purpose set forth, a locking hand lever and a foot lever connected by a rod and spring.

5. In a corn planter, and in combination substantially as described and for the purpose set forth, with forward and rear frames hinged to each other, a hand lever E, rack bar $e'$, foot lever G hinged at its forward end to the forward frame, rod H hinged to the hand lever, spring $h^4$ spirally coiled on the rod H, pin or stop $h^6$, bearing block $h$ pivotally mounted on the rear end part of the foot lever, and a pin or stop $h^3$.

6. In a corn planter, and in combination substantially as described, forward and rear frames hinged to each other, a clamp plate $e^3$ bolted to a transverse frame bar on the rear frame, a rack bar $e'$ integral with said clamp plate, a hand lever E and a foot lever G pivotally mounted on the rack bar $e'$ by a pivot bolt $e$, a rod H, having stops or pins $h^3$, $h^6$, a spring $h^4$, and a bearing block $h$ pivotally mounted on the foot lever.

7. In a corn planter, and in combination substantially as described, forward and rear frames hinged to each other, split collar or a clamp plate $e^3$ bolted to a transverse frame bar on the rear frame, a rack bar $e'$ integral with said clamp plate, and a hand lever E and foot lever G pivotally mounted on said rack bar $e'$ by a pivot bolt $e$.

8. In a corn planter, and in combination substantially as described, forward and rear frames hinged to each other, split collar or a clamp plate $e^3$ bolted to a transverse frame bar on the rear frame, a rack bar $e'$ integral with said clamp plate, a hand lever E and foot lever G pivotally mounted on said rack bar by a pivot bolt $e$, and a driver's seat, supported on standards $i$ and bars $i^2$ which are united at their forward ends by a part $i^3$ of said bars, which part $i^3$ is seated between the clamp $e^3$ and the frame bar $a^{12}$.

9. The herein described seed-cup wheel, comprising a disk rotatable substantially in a vertical plane, and a circular series of seed-cups formed of tapering grooves, in plates carried on arms which project laterally, or horizontally from one side of said disk, substantially as described.

10. The herein described seed-cup wheel, comprising a disk rotatable substantially in a vertical plane, and a circular series of seed-cups formed by the walls of tapering grooves at one side of said disk, each seed-cup inclined to a radial line from the axis of rotation of said disk, substantially as described.

11. In a corn planter, and in combination substantially as hereinbefore described, a seed-cup wheel comprising a disk rotatable substantially in a vertical plane and carrying a circular series of seed-cups at one side of said disk, each seed-cup formed by the wall of a tapering groove and inclined to a radial line from the axis of rotation of said disk, substantially as hereinbefore described and for the purposes specified, and a vertical wall having a flat plane surface against which said seed-cups revolve in their circular orbits, and an aperture through which the seed-cups discharge their contained grain of seed laterally of said seed-cups, and substantially parallel with the axis of rotation of the seed-cup wheel.

12. In a corn planter, and in combination substantially as hereinbefore described, a seed-cup wheel, comprising a disk rotatable substantially in a vertical plane and carrying a circular series of seed-cups at one side of said disk, each seed-cup inclined to a radial line from the axis of rotation of said disk substantially as hereinbefore described, and each consisting of a tapering groove with one side of the groove having a greater degree of curvature than its other side, and a vertical wall having a flat plane surface against which said seed-cups revolve in their circular orbits, and having an aperture through which the seed-cups discharge their grains of seed from their sides of least curvature.

13. In a corn planter, and in combination substantially as hereinbefore described, rotatory seed-cup wheels, a shaft connecting said seed-cup wheels and provided with a sprocket wheel, a sprocket wheel journaled on a standard, which standard is itself journaled to swing or oscillate on the axle of the planter, a sprocket chain geared with said sprocket wheels, and an adjustable rod connecting said swinging standard and the shaft connecting the seed-cup wheels, whereby said sprocket wheels can be adjusted at different distances apart.

14. In a corn planter, and in combination substantially as hereinbefore described, a forward and a rear frame hinged to each other and provided with means for raising and lowering the forward frame, rotatory seed-cup wheels and a shaft having a sprocket wheel, connecting said seed-cup wheels, all mounted on the forward frame, a sprocket wheel journaled on a standard, which standard is itself journaled to swing or oscillate on the axle of the rear frame, a sprocket chain which intergears with said sprocket wheels, and a rod connecting said swinging standard and the shaft connecting the seed-cup wheels, whereby when the forward frame is raised and lowered said sprocket wheels will be held at uniform distances apart.

15. In combination substantially as hereinbefore described, in a corn planter, a sprocket wheel M mounted on the axle B, sprocket wheels $n'$ and $n^9$ journaled at the upper end of a standard N, the lower end $n^5$ of which is loosely mounted on said axle, and adjustably connected with its upper end by a slot and bolt, whereby it may be lengthened or shortened to tighten or slacken the sprocket chain $n$ which gears the sprocket wheels M and $n'$ with each other as may be required in ordinary operation, and when the sprocket wheel $n'$ is substituted by a larger or smaller sprocket wheel to change the rate of velocity of the seed-cup wheels.

16. In a corn planter, and in combination substantially as hereinbefore described, a forward and rear frame hinged to each other and provided with lever mechanism for raising and lowering the forward frame, a sprocket wheel having clutch teeth forming one member of a clutch revolubly mounted on the planter axle and intergeared with the seed-cup wheels, a split sleeve also mounted on the axle to slide endlong thereof, a pin or pins projecting radially from the axle, and forming the other member of said clutch, an oscillatory sleeve mounted on the planter axle and provided with a radial arm, and a cam, means for connecting said cam with the split sleeve, and links connecting said radial arm and one of the levers for raising and lowering the forward frame, whereby said sprocket wheel is slid into gear with the axle in lowering the forward frame for operation, and out of gear therewith in raising the forward frame and runners above the ground surface.

17. In a corn planter, and in combination substantially as hereinbefore described, a forward and a rear frame hinged to each other, and provided with lever mechanism for raising and lowering the forward frame, a sprocket wheel M loosely mounted to slide on the axle B, intergeared with the seed-cup wheels and provided with clutch teeth adapted to engage with a pin or pins $b$ on said axle, a split sliding sleeve $m^2$ which carries said sprocket wheel in its sliding movements, a sleeve P with a hole $p'$, a pin $p$ projecting from the split sleeve into the hole $p'$, and provided with a pin or pins $p^2$ projecting into the slots $p^3$, an arm $p^5$ projecting from the sleeve P and provided with a slot $p^6$, a rocking sleeve R with an arm $r$, and links $r^3$, $r^5$, connecting said arm with the foot lever.

18. In a corn planter, and in combination substantially as hereinbefore described, a forward and a rear frame hinged to each other, and provided with lever mechanism for raising and lowering the forward frame, a sleeve, mounted loosely on the axle and provided with a cam oblique to said axle, a radial arm projecting from said sleeve and connected at its outer end by a link or links with one of the levers for raising and lowering the forward frame, a sprocket wheel intergeared with the seed-cup wheels, and means interposed between said sprocket wheel and said sleeve for sliding the sprocket wheel into and out of gear with a radial pin or pins on the axle.

19. In combination substantially as hereinbefore described, axle B having a radial pin $b$, rocking sleeve R, sliding sleeves $m^2$ and P, pin or bolt $p$ projecting from the sleeve $m^2$ into a hole $p'$ in the sleeve P, pin or pins $p^2$ projecting from the bolt $p$ through slots $p^3$ in the sleeve P, and a spring $p^4$ interposed between the end of the bolt $p$ and the closed end of the hole $p'$ to relieve all shock in coupling and uncoupling the sprocket wheel and the axle.

20. In a corn planter and in combination substantially as hereinbefore described, a rotatable axle, intergearing between said axle and the seed-cup wheels, wheels $c'$, $c^2$, loosely journaled on each end of said axle, and each wheel $c'$, $c^2$, provided with a clutch mechanism in the end of its hub adjacent to the hub of its companion wheel, and a dual clutch S fixed to the axle, interposed between the hubs of the wheels $c'$, $c^2$, and provided at each of its ends with a clutch mechanism adapted to engage with the adjacent wheel, substantially as described.

21. In a corn planter, and in combination substantially as hereinbefore described, a rotatable axle D, intergearing between said axle and the revoluble seed-cup wheels, wheels $c'$, $c^2$, loosely mounted on each end of said axle and provided with rims $c^7$ having their inner surfaces serrated or toothed, and a dual clutch S fixed on the axle between the hubs of the wheels $c'$, $c^2$, and provided at its ends with pawls $s^2$ and $s^3$, adapted to engage with the wheel hubs when either wheel is rotated by the forward movement of the planter, and arranged as described, whereby one wheel will rotate the axle when all of the other three slide upon the ground.

22. In a corn planter, and in combination substantially as hereinbefore described, a rotatable axle, revoluble seed cup wheels, mechanism intergearing said seed cup wheels and axle, a pair of wheels loosely and revolubly mounted on each end of said axle, clutch mechanism carried by the confronting ends of the hubs of the wheels of each pair of wheels, and a clutch mechanism fixed to the axle between the hubs of the wheels of each pair thereof, whereby either one or more of the four separate wheels will rotate the axle while the remaining wheel or wheels slide, or are not rotated.

23. In a corn planter, and in combination substantially as described, a check rower rock shaft F, a swinging seed detaining and discharging valve $a^{18}$ in the lower end of the seed tube, operated by links $a^{20}$ and radial arm $a^{21}$ on the rock shaft, a spring $f^9$ connected at one end with the radial arm $f^{10}$ on the rock shaft, and with a hook $f^{11}$ for holding it to act as a retractile spring for the rock shaft, and reversible to connect it with a hook $f^{12}$ for holding the valve $a^{18}$ in an inoperative position.

24. In a corn planter, and in combination substantially as described, forward and rear frames pivoted or hinged to each other, a hand lever and a foot lever, both pivotally mounted on said rear frame—the extended forward end of said foot lever hinged to the forward frame, means for connecting the hand and foot levers, involving an interposed spring, a sleeve on the planter axle, and links or arms, as $r^3$, $r^5$, connecting the foot lever with said sleeve, whereby the forward frame will be locked in its elevated position, when the foot lever is swung to raise it into such elevated position.

25. In a corn planter, and in combination substantially as hereinbefore described, forward and rear frames pivoted or hinged to each other, a foot lever pivotally mounted on said rear frame and having its forward end hinged to the forward frame, a sleeve on the planter axle, and links or arms connecting said foot lever with said sleeve, whereby the foot lever and thereby the forward frame are locked relatively to the rear frame, when the foot lever is swung to raise the forward frame to its elevated position above the ground surface.

26. In a corn planter, and in combination substantially as hereinbefore described, a rotatable axle, revoluble seed-cup wheels, mechanism intergearing said seed-cup wheels and axle, a pair of wheels loosely and revolubly mounted on each end of said axle to revolve, each wheel independently of the other three, clutch mechanism carried by each wheel, and a clutch mechanism fixed to the axle for each wheel, whereby either one or more of the four separate wheels will rotate the axle while the remaining wheels slide or are not rotated.

In testimony whereof I affix my signature in presence of two witnesses.

EUGENIO K. HAYES.

Witnesses:
L. M. RICHARDS,
H. M. RICHARDS.